Patented Jan. 25, 1949

2,460,056

UNITED STATES PATENT OFFICE 2,460,056

PURIFICATION OF UNSATURATED HYDROCARBON MIXTURES

Howard L. Yowell, Elizabeth, and Miller W. Swaney, Cranford, N. J., assignors to Standard Oil Development Company, a corporation of Delaware No Drawing. Application April 24, 1945
Serial No. 590,118

12 Claims. (Cl. 260—681.5)

The present invention relates to a method for removing non-hydrocarbon compounds from hydrocarbons, and more particularly to the elimination of oxygenated compounds from mixtures of hydrocarbons containing unsaturated hydrocarbons, especially diolefins.

The production of unsaturated hydrocarbons through pyrolysis of more saturated hydrocarbons is well known; for example, butanes, butenes or mixtures of butanes and butenes in varying proportions are converted by means of thermal and/or catalytic treatment into a product consisting predominantly of hydrocarbons having four carbon atoms to the molecule in which a considerable proportion of the compounds are diolefins. The cracking of petroleum fractions of molecular weights higher than butane gives similar reaction products. Where this cracking operation is carried out in the presence of small amounts of air, steam or other oxygen-containing substances, the resulting product, in addition to saturated hydrocarbons and unsaturated hydrocarbons such as olefins and diolefins, will be found to contain varying amounts of aldehydes and other oxidation products; for example, the product obtained from cracking $C_4$ hydrocarbons will be found to contain up to several per cent of formaldehyde, acetaldehyde or both. Because formaldehyde and acetaldehyde boil at a temperature very close to the boiling temperature range of $C_4$ hydrocarbons and for the additional reason that aldehydes form constant boiling mixtures with unsaturated constituents in a mixture of $C_4$ hydrocarbons, complete removal of the aldehydes from the $C_4$ hydrocarbons by ordinary distillation methods is virtually impossible of accomplishment. It has been suggested that the oxygenated products might be removed by solvent extraction but none of the ordinary solvents have been found to possess sufficient selectivity toward oxygenated products to efficiently accomplish this objective.

The diolefin hydrocarbons, as for example, butadiene, produced by thermal and/or catalytic cracking are very valuable materials and several methods have been developed for isolating or recovering such diolefins from hydrocarbon mixtures containing them. One such method is to absorb the diolefins in an aqueous ammoniacal cuprous salt solution, separate the aqueous and hydrocarbon phases, and to regenerate the diolefin from the ammoniacal cuprous salt complex thus formed in the aqueous phase by heating. The presence of oxygenated products such as aldehydes in the diolefin-containing hydrocarbon mixtures, is objectionable for several reasons. If aldehydes or other oxygenated products are present in the unsaturated hydrocarbon mixtures as impurities, it has been observed that they react with the absorbents for diolefins, thus degrading the absorbent. They also form complexes with certain solvents, especially the cuprous salt solutions, which tend to emulsify the aqueous and hydrocarbon phases so that a clear phase separation is not obtained and the diolefin product will be of lower purity because of entrained butylenes, etc. Also the aldehyde or other oxygenated products by reason of their activity with the diolefin absorbents may be carried along with the absorbed diolefin and regenerated from some solvents at the same time that the diolefin is regenerated, thus forming impurities in the concentrated diolefin. The presence of aldehydes in amounts greater than a few parts per million is objectionable when the diolefin is to be used for polymerization and copolymerizations of the types used in forming synthetic rubber.

It has been suggested that aldehydes and other oxygenated products might be removed from cracked hydrocarbon mixtures by water washing. The use of water washing, while applicable to $C_4$ cuts containing fairly large amounts of aldehydes, to remove a portion of the aldehydes, is not feasible for the reduction of the aldehyde content to the desired range of a few parts per million since the equilibrium distribution of aldehyde between the water and hydrocarbon phases is poor. It is shown below in Example 1 that the distribution ratio of acetaldehyde between equal volumes of a $C_4$ cut and water is only 10 to 1. The solubility of butadiene in water is quite appreciable, and becomes a serious factor when large ratios of water to hydrocarbons are used. Although it is thus shown that water is capable of removing the major proportion of the aldehyde from a hydrocarbon mixture, the quantity of aldehyde remaining in the $C_4$ cut may be sufficiently great to render the $C_4$ hydrocarbons undesirable as a source of butadiene for the reasons outlined above.

A principal object of the present invention is the provision of a method for improving the quality of diolefins obtainable from mixtures of hydrocarbons containing diolefins. Another object is to improve hydrocarbons, especially normally gaseous and light liquid hydrocarbons containing up to about 6 carbon atoms per molecule and containing olefins and/or diolefins. This and other objects will be apparent to those skilled in the art upon reading the following description.

It has now been found that the addition of a substance capable of forming complexes with aldehydes to the wash water which is to be used to wash aldehydes or other oxygenated compounds from hydrocarbon mixtures containing diolefins, greatly influences the ability of the wash water to extract such aldehydes and other oxygenated compounds from hydrocarbon mixtures and that the distribution factors then existing are of an entirely different order of magnitude than the 10 to 1 ratio obtained by water alone.

It has further been found that as long as the amount of material capable of forming complexes with oxygenated products exceeds the quantity of oxygenated products in the aqueous phase on a molal basis, such aqueous phase will effectively remove oxygenated compounds from hydrocarbon mixtures; in other words, by maintaining the mol ratio of the substance capable of forming complexes with oxygenated compounds, to oxygenated compounds at greater than 1 in the aqueous phase, the ability of the aqueous phase to extract oxygenated compounds from hydrocarbon mixtures is sustained. Thus the removal of small residual traces of oxygenated compounds from hydrocarbon mixtures is greatly facilitated. Among the substances which form complexes with oxygenated substances such as aldehydes there may be mentioned ammonia, water-soluble amines such as alkyl amines; alkylol amines such as ethanol amine and certain inorganic salts such as cyanides, hydroxylamine, and the like, although ammonia has been found to be the most efficacious and is preferred. Chief among the oxygenated compounds which may be removed from hydrocarbon mixtures through the use of the present invention are the aldehydes such as formaldehyde, acetaldehyde, etc.

The present invention may be operated in any of several ways, for example a hydrocarbon material which contains aldehyde or other oxygenated product, may be contacted with the aqueous extractant in either gas-liquid or liquid-liquid operation. Contact between the aqueous phase and the hydrocarbon phase can be accomplished either countercurrently through a packed tower or plate tower, concurrently through a turbo mixer, or by the batch method. Either of the latter two methods necessitates the use of a settling time to permit phase separation to take place. The two phases can then be separated and the hydrocarbon phase treated for the recovery of diolefins. The aqueous phase can then be regenerated by distillation with recovery and recycling of the ammonia.

The invention will be better understood from the following detailed examples which are included for the purpose of illustration only.

EXAMPLE 1

100 cc. of water was placed in a bomb and 100 cc. of liquid cracked $C_4$ cut containing acetaldehyde (0.044 mol per liter) was then introduced into the bomb and the bomb sealed and shaken for 20 minutes at room temperature. After settling, the hydrocarbon phase was analyzed and found to contain 0.004 mol per liter of acetaldehyde. This establishes that the ratio between acetaldehyde in the aqueous phase and acetaldehyde in the hydrocarbon phase is 10 to 1 where an equal volume of water is used as the extractant.

EXAMPLE 2

100 cc. of water containing 1.94 mols of ammonia as determined by titration were placed in a bomb and cooled to about $-20°$ C. 100 cc. of cracked $C_4$ hydrocarbons containing 0.097 mol of acetaldehyde per liter were then run into the bomb and the bomb sealed. The bomb was permitted to warm up to room temperature and then shaken for 20 minutes. (Where the extraction is conducted in the liquid phase, the temperature range for extraction is controlled by the freezing point of the aqueous phase as a lower limit and the ability of the vessel to withstand the vapor pressure of the hydrocarbon at the temperatures used as an upper limit. In general, it is preferable to conduct the extraction at a temperature below 100° C. in order to reduce the dissociation of the aldehyde-ammonia complex.) After phase separation, the hydrocarbon phase was analyzed for acetaldehyde and found to contain less than 0.0003 mol per liter (the limit of accuracy of the analytical method). The results of this experiment indicate an almost infinite ratio between the aldehyde in the aqueous phase and aldehyde in the hydrocarbon phase.

Additional distribution experiments III–IX were carried out using varying amounts of aldehyde and ammonia. The results of all these tests are summarized in the following table:

TABLE I

Distribution of acetaldehyde between $C_4$ and aqueous phases [1] at 25° C.

| | Equilibrium Composition of Aqueous Phase Moles $NH_3$ per Liter/ Moles Acetaldehyde per Liter | Equil. Conc. of Acetaldehyde in $C_4$ Phase Moles/Liter | Aldehyde Distribution Factor Moles Aldehyde in $H_2O$/Moles Aldehyde in $C_4$ |
|---|---|---|---|
| I | 0/0.04 | 0.004 | 10. |
| II | 1.94/0.097 | <0.0003 | Immeasurably high. |
| III | 1.94/0.485 | <0.0003 | Do. |
| IV | 1.94/0.970 | 0.0005 | 2,155. |
| V | 1.94/1.94 | 0.0051 | 379. |
| VI | 3.94/1.09 | <0.0003 | Immeasurably high. |
| VII | 3.94/2.17 | 0.0005 | 4,344. |
| VIII | 6.08/4.44 | 0.0004 | 11,099. |
| IX | 3.05/3.66 | 0.0419 | 86. |

[1] Equal volumes of aqueous and $C_4$ phases employed.

It is thus apparent that ratios of $NH_3$/aldehyde greater than 1 are greatly to be preferred, although substantial improvement in the aldehyde distribution factor is obtained when even equal or smaller ratios of ammonia to aldehyde are used, in comparison to the effect of water alone.

What is claimed is:

1. The method of removing formaldehyde from mixtures of formaldehyde and hydrocarbons containing butadiene which comprises contacting said mixtures with a dilute aqueous solution of ammonia under such conditions that the mol ratio of ammonia to formaldehyde is greater than 1.

2. A process of purifying aldehyde contaminated hydrocarbons which comprises bringing the contaminated hydrocarbons into contact with a dilute aqueous solution of a compound selected from the class consisting of ammonia and water-soluble amines and thereafter separating the hydrocarbons from said aqueous solution.

3. A process of purifying aldehyde contaminated hydrocarbons which comprises bringing the contaminated hydrocarbons into contact with a dilute aqueous solution of ammonia and thereafter separating the hydrocarbons from said aqueous solution.

4. A process according to claim 3 in which the mol ratio of ammonia to aldehyde is greater than one.

5. A process of purifying liquefied normally gaseous hydrocarbons containing aldehyde contaminants which comprises bringing the contaminated hydrocarbons into contact with a dilute aqueous solution of ammonia and thereafter separating the hydrocarbons from said aqueous solution.

6. A process according to claim 5 in which the mol ratio of ammonia to aldehyde is greater than one.

7. A process of purifying aldehyde contaminated hydrocarbons consisting substantially of diolefins which comprises contacting the contaminated hydrocarbons with a dilute aqueous solution of ammonia and thereafter separating the hydrocarbons from said aqueous solution.

8. A process according to claim 7 in which the mol ratio of ammonia to aldehyde is greater than one.

9. A process of purifying aldehyde contaminated hydrocarbons consisting substantially of butadiene which comprises contacting the contaminated hydrocarbons with a dilute aqueous solution of ammonia and thereafter separating the hydrocarbons from said aqueous solution.

10. A process according to claim 9 in which the mol ratio of ammonia to aldehyde is greater than one.

11. A process for purifying aldehyde contaminated hydrocarbons which comprises bringing the contaminated hydrocarbons into contact with a dilute aqueous solution of a water-soluble amine, and thereafter separating the hydrocarbons from said aqueous solution.

12. A process according to claim 11 in which the mol ratio of water-soluble amine to aldehyde is greater than 1.

HOWARD L. YOWELL.
MILLER W. SWANEY.

REFERENCES CITED

The following references are of record in the file of this patent:

UNITED STATES PATENTS

| Number | Name | Date |
| --- | --- | --- |
| 1,696,479 | Hand | Dec. 25, 1928 |
| 1,737,391 | Scott | Nov. 26, 1929 |
| 1,987,601 | Burke | Jan. 15, 1935 |
| 2,045,574 | Adkins et al. | June 30, 1936 |
| 2,418,183 | McCombie et al. | Apr. 1, 1947 |